United States Patent [19]
Mitsumori et al.

[11] Patent Number: 5,535,059
[45] Date of Patent: Jul. 9, 1996

[54] OBJECTIVE LENS DRIVE DEVICE AND COIL BOBBIN THEREOF

[75] Inventors: Koji Mitsumori; Takamichi Tomiyama; Keiichi Shibata, all of Chiba, Japan

[73] Assignee: Sony Corporation, Tokyo, Japan

[21] Appl. No.: 357,711

[22] Filed: Dec. 16, 1994

[30] Foreign Application Priority Data

Dec. 22, 1993 [JP] Japan .................................. 5-346121

[51] Int. Cl.⁶ ...................................................... G02B 7/02
[52] U.S. Cl. ........................... 359/813; 359/823; 359/814
[58] Field of Search .................................. 359/813, 814, 359/823, 824; 369/44.15, 44.16

[56] References Cited

U.S. PATENT DOCUMENTS

| | | | |
|---|---|---|---|
| 4,449,213 | 5/1984 | Noborimoto et al. | 369/45 |
| 4,653,856 | 3/1987 | Kamiko | 350/255 |
| 4,669,823 | 6/1987 | Iguma et al. | 359/814 |
| 4,702,555 | 10/1987 | Iguma et al. | 359/814 |
| 4,766,583 | 8/1988 | Oinoue et al. | 369/45 |
| 4,927,235 | 5/1990 | Narumi | 359/814 |
| 4,948,230 | 8/1990 | Kasahara et al. | 350/255 |
| 5,046,820 | 9/1991 | Saekusa et al. | 359/814 |
| 5,073,883 | 12/1991 | Mitsumori | 369/44.15 |
| 5,144,607 | 9/1992 | Ishida et al. | 369/44.15 |
| 5,161,067 | 11/1992 | Tomiyama et al. | 359/824 |
| 5,208,703 | 5/1993 | Ikegame et al. | 359/813 |
| 5,220,459 | 6/1993 | Ichikawa et al. | 359/811 |
| 5,313,334 | 5/1994 | Tomiyama et al. | 359/824 |
| 5,323,378 | 6/1994 | Kim et al. | 369/247 |
| 5,428,481 | 6/1995 | Ikegame et al. | 359/811 |

FOREIGN PATENT DOCUMENTS

| | | | |
|---|---|---|---|
| 0459080A3 | 12/1991 | European Pat. Off. | G11B 7/08 |
| 0617419A1 | 9/1994 | European Pat. Off. | G11B 7/09 |

OTHER PUBLICATIONS

Patent Abstract of Japan, vol. 15, No. 147 (E-1055), Apr. 12, 1991, and JP-A-03 022 509 (Tokyo Electric Co. Ltd.), Jan. 30, 1991.
Patent Abstracts of Japan, vol. 13, no. 8 (E-702) Jan. 10, 1989, and JP-A-63 219 113 (Matsushita Electric Inc. Co., Ltd.), Sep. 12, 1988.
Patent Abstracts of Japan, vol. 16, No. 292 (P-1377) Jun. 29, 1992 and JP-A-04 078 005 (Canon Electron Inc.), Mar. 12, 1992.
Patent Abstracts of Japan, vol. 15, No. 143 (E-1054), Apr. 11, 1991 & JP-A-03 020 005 (Matshushita Electric Ind. Co., Ltd.), Jan. 29, 1991.
Patent Abstracts of Japan, vol. 10, No. 170 (E-412) Jun. 17, 1986 and JP-A-61 023 307 (Kijima Musen KK), Jan. 31, 1986.
Patent Abstracts of Japan, vol. 5, No. 117 (E-067), Jul. 28, 1981 and JP-A-56 056 140 (Matsushita Electric Ind. Co., Ltd.), May 18, 1981.

*Primary Examiner*—Loha Ben
*Attorney, Agent, or Firm*—Limbach & Limbach

[57] ABSTRACT

An objective lens drive device used in a an optical recording and/or reproducing apparatus includes a lens holder, a plurality of elastic supporting members and a coil bobbin. The lens holder holds an objective lens. Each one end portion of the plurality of elastic supporting members are fixed to the lens holder and each other end portion of the elastic supporting members are fixed to a fixed portion. The plurality of elastic supporting members movably support the lens holder in a parallel direction of the objective lens and a horizontal direction ortjogonal to the optical axis of the objective lens. A focussing coil is wound around the coil bobbin. At least one tracking coil is attached to the focussing coil. The coil bobbin is provided with a plurality of terminals to project therefrom. The terminals are wound with the end portions of the focussing coils and the end portions of the tracking coil.

10 Claims, 9 Drawing Sheets

OBJECTIVE LENS DRIVE DEVICE AND COIL BOBBIN THEREOF

BACKGROUND OF THE INVENTION

This invention relates to a coil bobbin and an objective lens drive device, and particularly to a coil bobbin having a plurality of coils and to an objective lens drive device in which this coil bobbin is used.

Optical recording medium, for example optical disc recording and/or reproducing apparatuses perform recording or reproduction of information signals on an optical recording medium by irradiating a light beam from an optical pickup onto the recording medium. The light beam emitted by the optical pickup is focussed onto the recording surface of the optical recording medium by an objective lens. The objective lens is so driven in a focussing direction and a tracking direction by an objective lens drive device that it follows-up any eccentricity and vertical motion of the optical disc. An electromagnetic-drive actuator is used as this objective lens drive device.

An objective lens drive device is constructed for example as shown in FIG. 1. In FIG. 1, an objective lens drive device 1 has a lens holder 2, a coil bobbin 3, a fixed portion 4, a plurality of supporting members 5, a yoke 6, a permanent magnet 7 and a base 8.

An objective lens 2a is mounted in one end of the lens holder 2, and the coil bobbin 3 is mounted in the other end. The lens holder 2 is supported by the plurality of supporting members 5 movably in a direction parallel to the optical axis of the objective lens 2a, namely the focussing direction Fcs, and in a horizontal direction orthogonal to the optical axis of the objective lens 2a, namely the tracking direction Trk.

The coil bobbin 3 is formed in a square-shaped having a central through hole and is so fixed in the lens holder 2 that the through hole extends in a direction parallel to the optical axis of the objective lens 2a. The coil bobbin 3 has a focussing coil (not shown in the drawing) wound thereon along the direction of the optical axis of the objective lens 2a and a plurality of tracking coils (not shown in the drawing) are arranged on one side thereof. The tracking coils are composed of lead wires wound in rectangular planar coils. The focussing coil and the tracking coils are connected to electricity supply wires (not shown in the drawing), and a focussing drive signal and a tracking drive signal are supplied to the respective coils through these electricity supply wires. The plurality of supporting members 5 are made of elastic members such as plated springs.

The plurality of supporting members 5 each have one end fixed to the lens holder 2 and the other end fixed to the fixed portion 4 so that they are mutually parallel. As a result, the plurality of supporting members 5 support the lens holder 2 movably in the focussing direction Fcs and the tracking direction Trk. The fixed portion 4 is mounted on the base 8.

The yoke 6 has mutually opposing yoke portions 6a and 6b and is formed in a cross-sectionally U-shaped. A permanent magnet 7 is mounted on one of the yoke portions 6a, 6b. In the construction shown in FIG. 1, the permanent magnet 7 is mounted on the yoke portion 6a and inserted into the through hole of the coil bobbin 3, and the other yoke portion 6b faces the focussing coil and the tracking coils of the coil bobbin 3. The base 8 is formed in a platelike shape and is made of a metallic material, and is provided the yoke 6 on a portion thereof.

In the objective lens drive device 1 constructed as described above, a focussing drive signal and a tracking drive signal are supplied to the focussing coil and the tracking coils through the electricity supply wires (not shown). Because as shown in FIG. 1 the focussing coil and the tracking coils are located in a gap between the yoke portion 6b and the magnet 7, the magnetic fields generated from the focussing coil and the tracking coils cross the magnetic flux between the magnet 7 and the yoke portion 6b. As a result, driving forces which move the lens holder 2 in the focussing direction Fcs and the tracking direction Trk are generated, and the lens holder 2 is moved in the focussing direction Fcs and the tracking direction Trk in accordance with the focussing drive signal and the tracking drive signal. The light beam focussed onto the recording surface of the optical disc by the objective lens 2a is so controlled that it follows-up any eccentricity of the optical disc and any vertical motion of the recording surface of the optical disc.

In the objective lens drive device 1 shown in FIG. 1, the end portions of the lead wires of the focussing coil and the tracking coils are severally electrically connected by soldering or the like to terminal portions, not shown, provided on the lens holder 2. However, because the coil bobbin 3, the focussing coil and the tracking coils are small, and because the lead wires constituting the focussing coil and the tracking coil are thin, the assembly of connecting the end portions of the lead wires to the lens holder 2 has been complicated and difficult. Also, there have been such problems as that this kind of construction is not suited to machine assembly and cost savings cannot be achieved.

Furthermore, after the objective lens drive device 1 is assembled, continuity checking of the coils and measurement of the magnetic fields generated by the coils are carried out by voltages being impressed across the coil terminals, but in practice it has been difficult to perform coil continuity checking and measurement of the magnetic fields generated by the coils during the assembly process.

SUMMARY OF THE INVENTION

It is, therefore, an object of the present invention to provide an objective lens drive device which resolves the above-mentioned problems.

It is another object of the present invention to provide a coil bobbin which resolves the above-mentioned problems.

According to the present invention, there is provided an objective lens drive device including a lens holder, a plurality of elastic supporting members and a coil bobbin. The lens holder holds an objective lens. The plurality of elastic supporting members each have one end fixed to the lens holder and another end fixed to a fixed portion. The elastic supporting members movably support the lens holder in a direction parallel to the optical axis of the objective lens and in a horizontal direction orthogonal to the optical axis of the objective lens. The coil bobbin has a focussing coil wound around it and includes at least one tracking coil. The coil bobbin is provided with a plurality of projecting terminals on which are wound the ends of said focussing coil and the tracking coil.

Also, according to the present invention, there is provided a coil bobbin including a tubular body, a first coil, at least one second coil and a plurality of terminals. The body is formed in a tubular shape. The first coil is wound around the outside surface of the body in the axial direction thereof. The second coil has a central opening and arranged on the first coil. The terminals are projected from the body and are provided on the upper and lower side axial direction ends of the body. The plurality of terminals are severally wound around the end portions of the first and second coils.

With this invention, by the terminals on which the ends of the coils for generating the driving forces for driving the objective lens are wound being so formed that they project from the coil bobbin on which the coils are wound, the electrical connection work can be carried out easily.

DESCRIPTION OF THE INVENTION

An objective lens drive device according to the present invention will now be described in detail with reference to the accompanying drawings.

Figure 1:
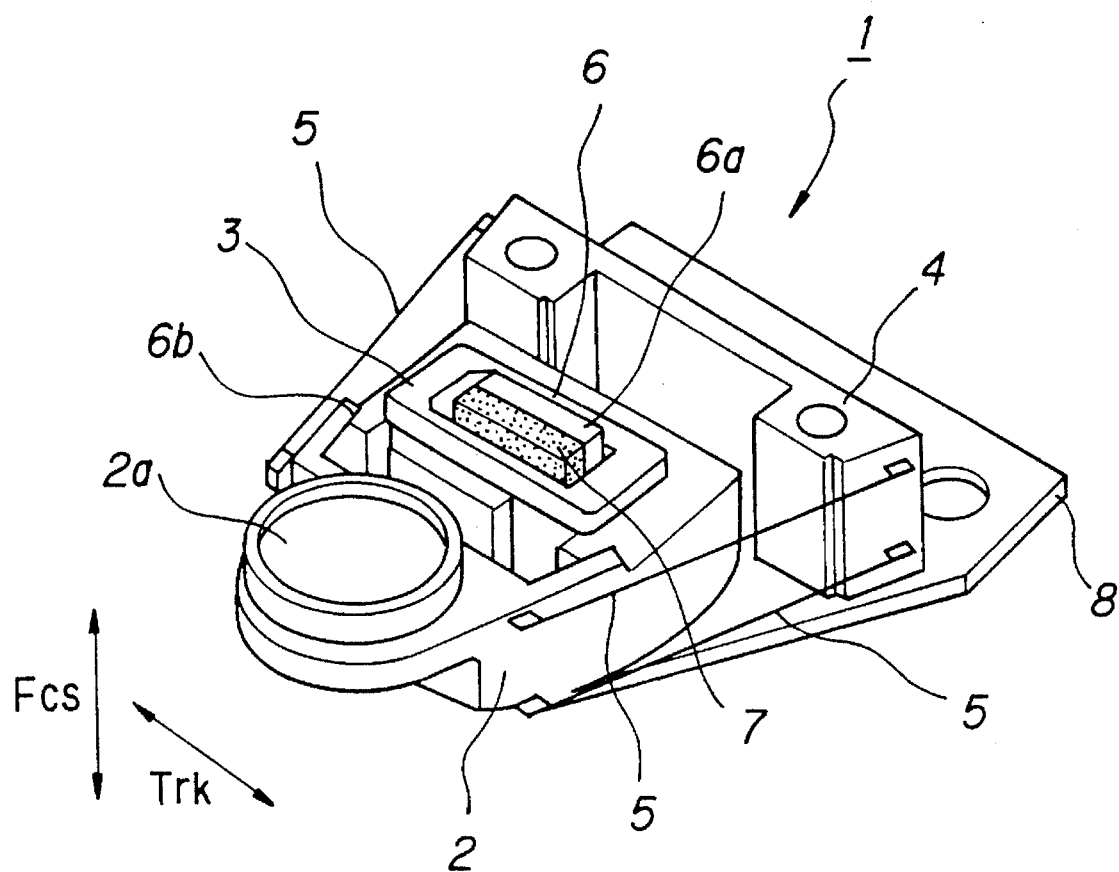
FIG. 1 is a perspective view of an example of an objective lens drive device.
Figure 2:
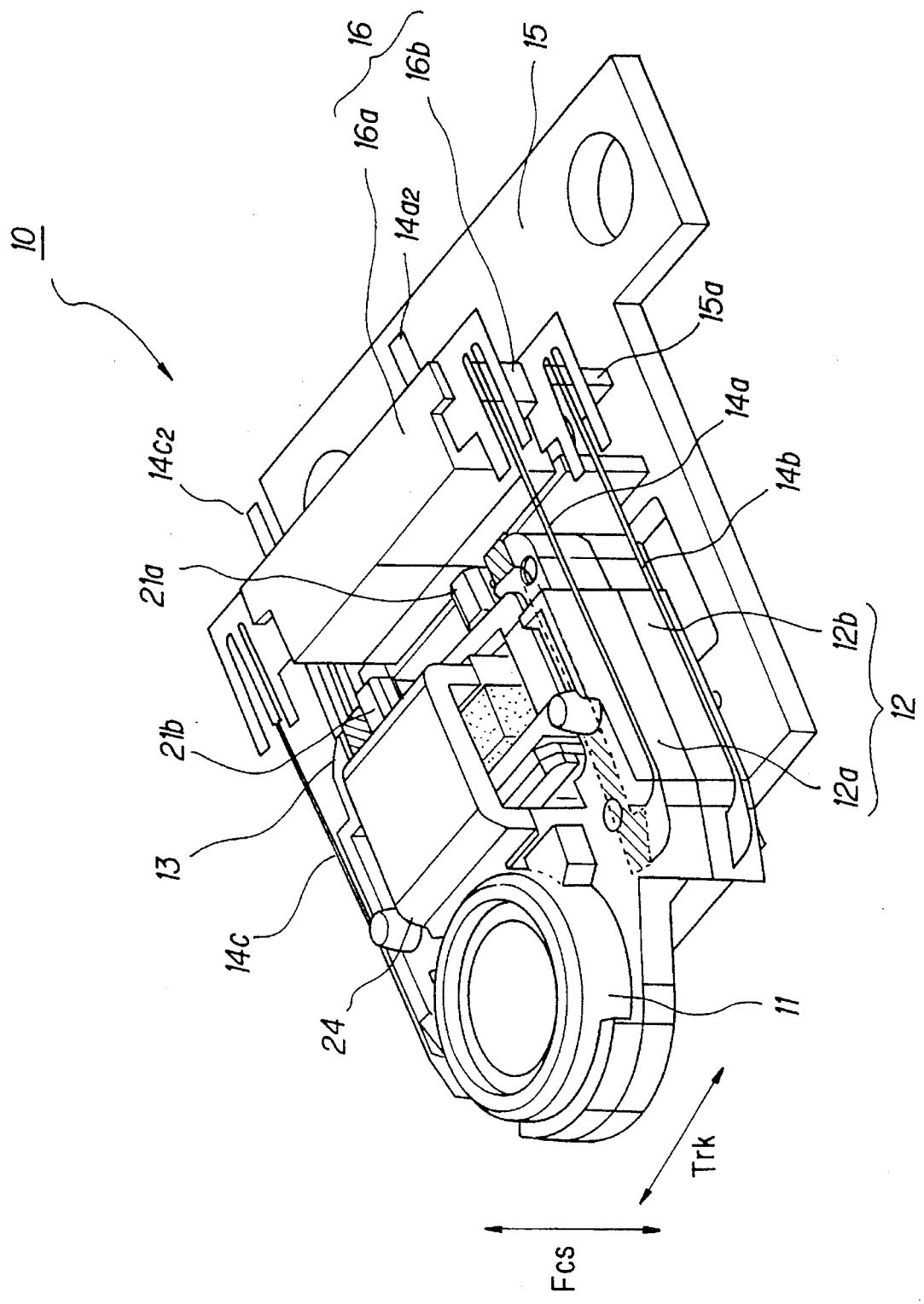
FIG. 2 is a perspective view of an objective lens drive device according to the invention.
Figure 3:
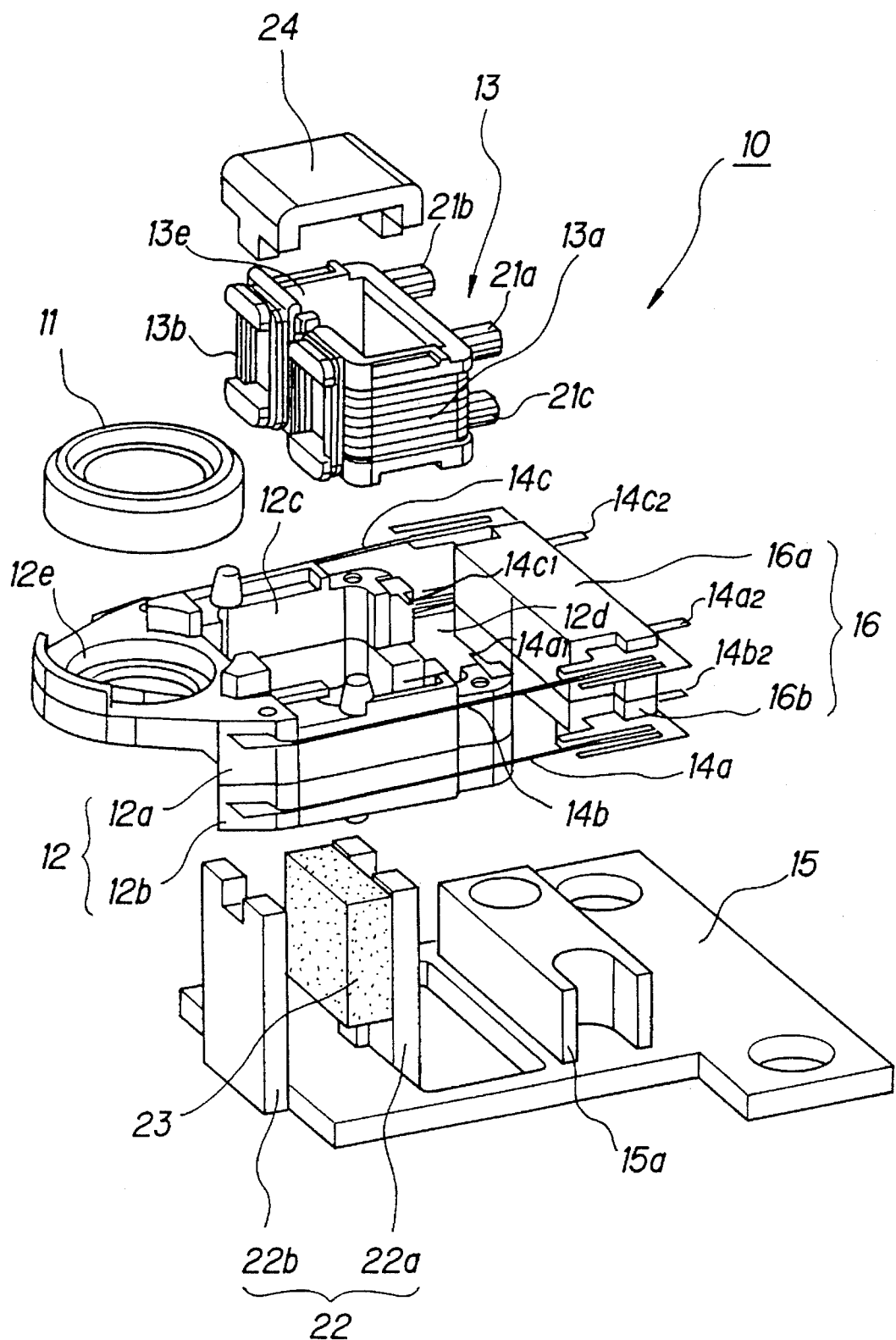
FIG. 3 is an exploded perspective view of an objective lens drive device according to the invention.
Figure 4:
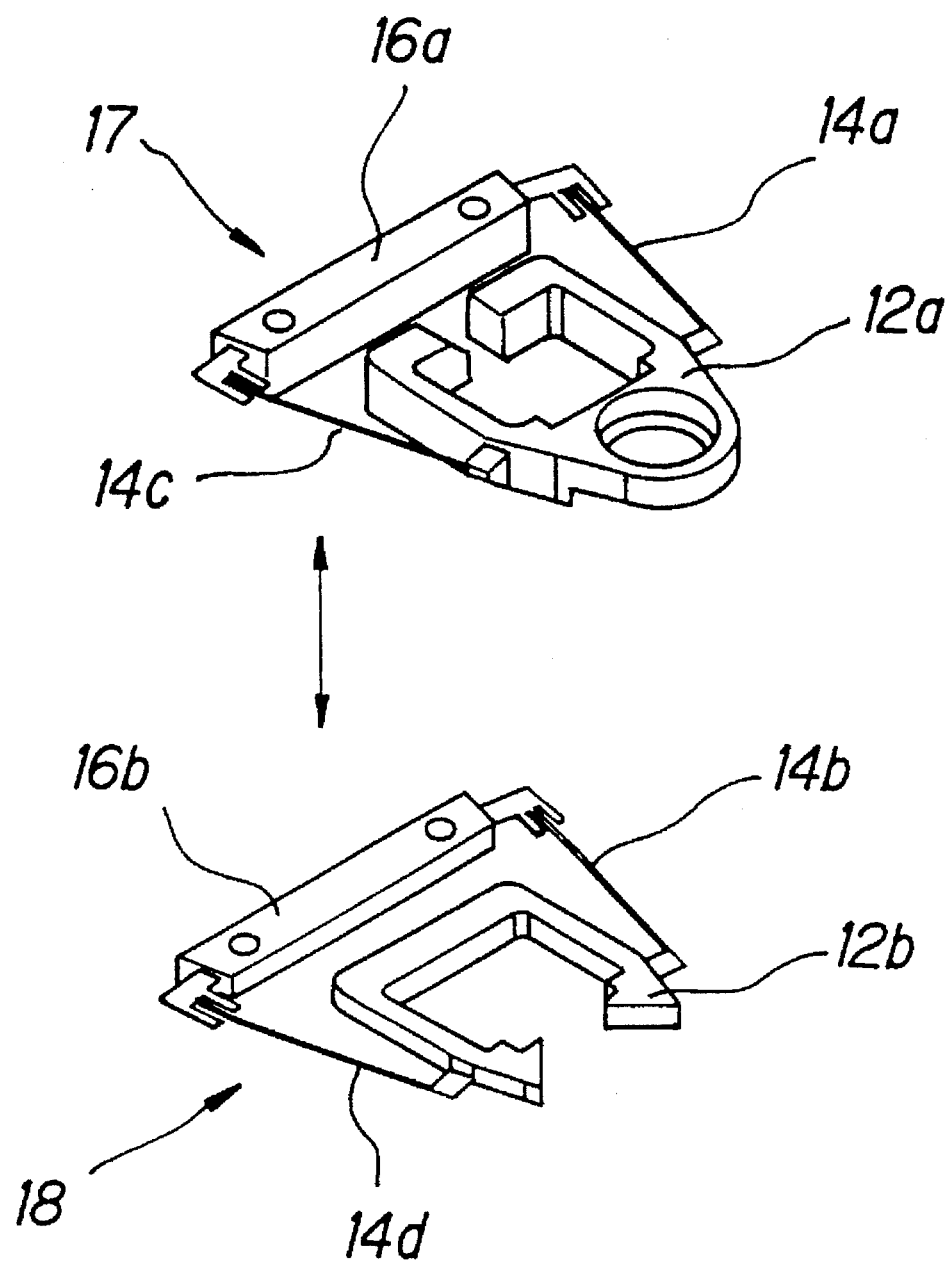
FIG. 4 is an exploded perspective view of an upper assembly body and a lower assembly body.

As shown in FIGS. 2, 3 and 4, an objective lens drive device 10 has a lens holder 12, a coil bobbin 13, a plurality of elastic supporting members 14a, 14b, 14c and 14d, a fixing member 16 and a base 15.

An objective lens 11 is arranged in an opening portion 12e formed in one end, which is a free end, of the lens holder 12, and an opening portion 12c in which the coil bobbin 13 is fixed is formed in the other end. The lens holder 12 is composed of an upper holder portion 12a and a lower holder portion 12b molded together from a synthetic resin with the plurality of elastic supporting members 14a, 14b, 14c and 14d as will be described later. A notch portion 12d is formed in part of a side face of the opening portion 12c in the lens holder. This notch portion 12d is so formed that at least the whole of a side face of the upper holder portion 12a forming the opening portion 12c is cut away. The end portions $14a_1$, $14b_1$, $14c_1$ and $14d_1$ of the plurality of elastic supporting members 14a, 14b, 14c and 14d project into the notch portion 12d opposite each other, and are electrically connected by soldering as will be described later to terminal portions on the coil bobbin 13. The end portions $14b_1$ and $14d_1$ are not visible in the drawings. The lower holder portion 12b has a notch portion corresponding to the objective lens 11 and is formed in substantially U-shaped as shown in FIG. 4. The notch portion of the lower holder portion 12b corresponding to the objective lens 11 is possible to pass a light beam emitted from a light source which is not shown to the objective lens 11 and a return beam reflected by the recording medium. The objective lens 11 is a single lens of which both faces are aspherical and made out of glass or an optically transparent synthetic resin.

Figure 6A:
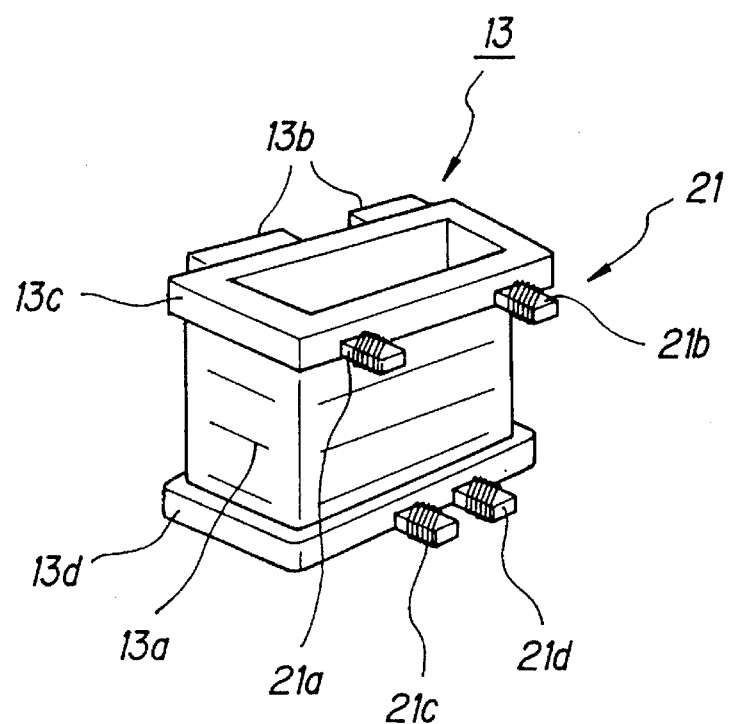
FIG. 6(A) is a perspective view of a coil bobbin used in an objective lens drive device according to the invention.

The coil bobbin 13 is formed out of synthetic resin or the like in a square pole shape having a central square through hole 13e, as shown in FIG. 6(A), to a size such that it can be inserted into the opening portion 12c in the lens holder 12, and flange portions 13c and 13d are formed at its upper and lower ends respectively. The portion between the flange portions 13c and 13d is a winding portion around which is wound a lead wire constituting a focussing coil 13a. The focussing coil 13a is wound around the coil bobbin 13 in the direction of the optical axis of the objective lens 11. A pair of coil portions constituting a tracking coil 13b are so formed that the planar shape of each is substantially square. The pair of coil portions of the tracking coil 13b are mounted on a side face of the focussing coil 13a, and these coil portions are wound consecutively using one lead wire. The pair of coil portions of the tracking coil 13b are fixed to one side of the focussing coil 13a as shown in FIG. 3. The shape of the coil portions of the tracking coil 13b is not limited to the substantially square shape mentioned above, and any shape having sides parallel to the optical axis of the objective lens 11 will do.

On the side of the coil bobbin 13 opposite to that on which the tracking coil 13b is mounted, a plurality of pin-like terminal portions 21a, 21b, 21c and 21d are so provided that they project from the upper and lower flange portions 13c and 13d. The distance between the two terminal portions 21a and 21b located at the upper flange portion 13c end is narrower than the distance between the terminal portions 21c and 21d at the lower flange portion 13d end.

Figure 7:
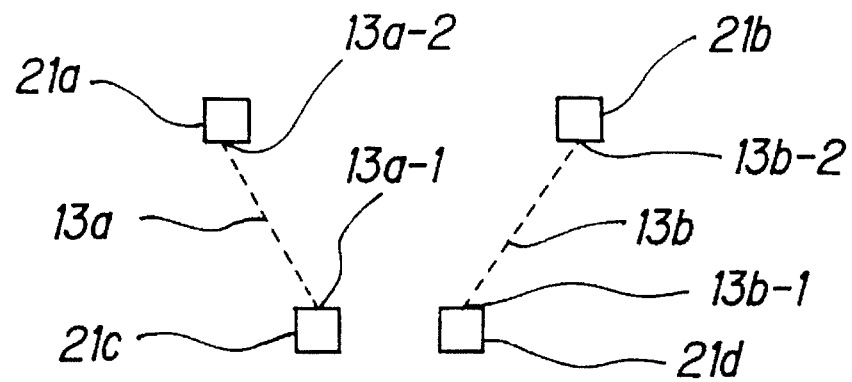
FIG. 7 is a diagram showing an example of a relationship between terminal portions and the winding starts and winding ends of a focussing coil and a tracking coil.
Figure 8:
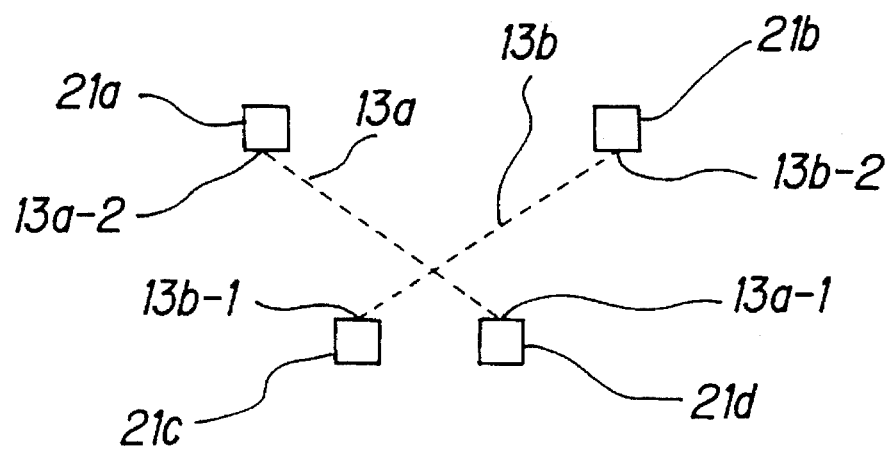
FIG. 8 is a diagram showing another example of a relationship between terminal portions and the winding starts and winding ends of a focussing coil and a tracking coil.

The end portions at the winding starts and the winding ends of the focussing coil 13a and the tracking coil 13b are severally wound around the plurality of terminal portions 21a, 21b, 21c and 21d. For example, as shown in FIG. 7, the winding start 13a-1 of the focussing coil 13a and the winding start 13b-1 of the tracking coil 13b are wound around the terminal portions 21c and 21d respectively, and the winding end 13a-2 of the focussing coil 13a and the winding end 13b-2 of the tracking coil 13b are wound around the terminal portions 21a and 21b respectively. Alternatively, as shown in FIG. 8, the winding start 13a-1 of the focussing coil 13a and the winding start 13b-1 of the tracking coil 13b may be wound around the terminal portions 21d and 21c respectively, and the winding end 13a-2 of the focussing coil 13a and the winding end 13b-2 of the tracking coil 13b may be wound around the terminal portions 21a and 21b respectively. In the example shown in FIG. 8, the winding start and the winding end of the focussing coil 13a cross the winding start and the winding end of the tracking coil 13b. The winding start 13a-1 of the focussing coil 13a and the winding start 13b-1 of the tracking coil 13b are doubly wound on the respective terminal portions in order to prevent fraying of the lead wires.

When the coil bobbin 13 is fixed into the lens holder 12 as described above, these terminal portions 21a, 21b, 21c and 21d engage with end portions which will be discussed later of the elastic supporting members 14a, 14b, 14c and 14d and are electrically connected thereto by soldering.

The upper end of the coil bobbin 13 is covered by a cover 24 as shown in FIG. 2.

The plurality of elastic supporting members 14a, 14b, 14c and 14d are of narrow plate form and are made of an elastic and electrically conductive material for example a metallic material. The elastic supporting members 14a, 14b, 14c and 14d each have one end fixed to the lens holder 12 and the other end fixed to the fixing member 16. Because they are narrow in width, these elastic supporting members 14a, 14b, 14c and 14d can displace in both the focussing direction Fcs and the tracking direction Trk. The lens holder 12 is supported by these elastic supporting members 14a, 14b, 14c and 14d movably in a direction parallel to the optical axis of the objective lens 11, namely the focussing direction Fcs, and a horizontal direction orthogonal to the optical axis of the objective lens 11, namely the tracking direction Trk. The two elastic supporting members 14a and 14c are molded unitedly with the upper holder portion 12a of the lens holder 12 and the upper fixing portion 16a of the fixing member 16 by outsert molding and are so molded that the above-mentioned end portions $14a_1$ and $14c_1$ project into the notch portion 12d. The portions of the two elastic supporting members 14a and 14c to which the upper holder portion 12a is unitedly molded include arm portions each bent back toward the fixing member 16, as shown with hatching in FIG. 2, and the end portions $14a_1$ and $14c_1$ which are electrically connected to the above-mentioned terminal portions 21a and 21b are formed at the ends of these arm portions. Thus is constituted an upper assembly body 17.

The other two elastic supporting members 14b and 14d, like the two elastic supporting members 14a and 14c mentioned above, are formed unitedly with the lower holder portion 12b and the lower fixing portion 16b by an outsert molding method. Thus is formed a lower assembly body 18 as shown in FIG. 4.

Figure 5:
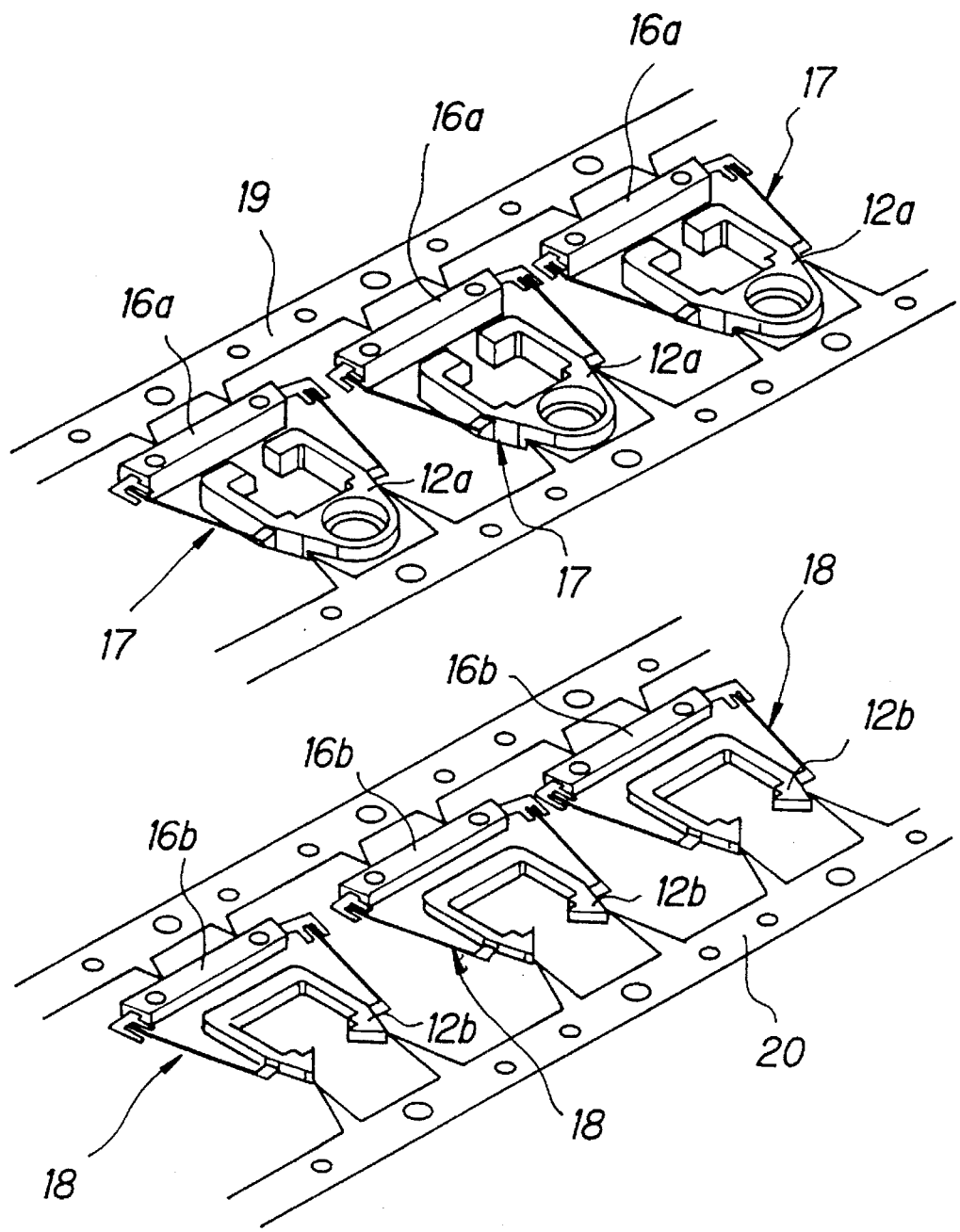
FIG. 5 is a perspective view of upper assembly body and lower assembly body moldings.

The method by which the upper and lower assembly bodies 17 and 18 are manufactured will now be explained more specifically with reference to FIG. 5. The two elastic supporting members 14a and 14c with which the upper holder portion 12a is to be unitedly molded are continuously formed in parallel with a first lead frame 19 as shown in FIG. 5 by a punching process. Similarly, the two elastic supporting members 14b and 14d with which the lower holder portion 12b is to be unitedly molded are continuously formed in parallel with a second lead frame 20 as shown in FIG. 5 by a punching process. With the elastic supporting members 14a, 14b, 14c and 14d formed in the first and second lead frames, the first and second lead frames 19 and 20 are each put into and held in an injection molding die. Synthetic resin is injected into the dies, an upper holder portion 12a and an upper fixing portion 16a are injection molded onto the first lead frame 19 and a lower holder portion 12b and a lower fixing portion 16b are injection molded onto the second lead frame 20. As a result, as shown in FIG. 5, a plurality of upper and lower assembly bodies 17 and 18 are simultaneously molded on the first and second lead frames 19 and 20.

Before the upper and lower assembly bodies 17 and 18 thus molded are cut from the first and second lead frames 19 and 20, the upper holder portion 12a and the lower holder portion 12b, and the upper fixing portion 16a and the lower fixing portion 16b, are fixed or joined together by adhesion or an ultrasonic welding method or the like. As a result, the lens holder 12 is supported by the plurality of elastic supporting members 14a, 14b, 14c and 14d movably in the focussing direction Fcs and the tracking direction Trk. The other ends $14a_2$, $14b_2$, $14c_2$ and $14d_2$ of the elastic supporting members 14a, 14b, 14c and 14d severally project from the rear side of the fixing member 16, and function as terminals through which a focussing drive signal and a tracking drive signal are supplied from a servo circuit (not shown). The end $14d_2$ is not visible in the drawings.

The base 15 is composed of a platelike member made of a rigid material such as metal. The base 15 is formed with a mounting portion 15a to project therefrom. The mounting portion 15a is fixed to the fixing member 16. The base 15 is further provided with a pair of yoke portions 22a and 22b at one end of the base 15. The pair of yoke portions 22a and 22b are provided vertically on the base 15 so that they oppose each other, and a permanent magnet 23 is mounted on one of the yoke portions 22a and 22b, such as the yoke portion 22a as illustrated in FIG. 3. A gap of a predetermined width is formed between the yoke portion 22b and the magnet 23, and the focussing coil 13a and the tracking coil 13b are inserted into this gap. The base 15 is arranged on the body of an optical pickup device (not shown).

The objective lens 11 is fixed in the opening portion 12e of the upper holder portion 12a using an adhesive or the like, and the coil bobbin 13 is inserted into the opening portion 12c of the lens holder 12, as shown in FIG. 3, with the upper and lower assembly bodies 17 and 18 integrated as described above. At this time, as shown in FIG. 6(A), because the distance between the terminal portions 21c and 21d was made narrower than the distance between the terminal portions 21a and 21b, the coil bobbin 13 can be inserted into the opening portion 12c of the lens holder 12 easily. When the coil bobbin 13 is inserted into the opening portion 12c in the lens holder 12, it is fixed to the lens holder 12 by an adhesive or the like. When the coil bobbin 13 has been inserted into the opening portion 12c of the lens holder 12, the terminal portions 21a, 21b, 21c and 21d are positioned in the notch portion 12d in the lens holder 12. The plurality of terminal portions 21a, 21b, 21c and 21d are then electrically connected by soldering to the end portions $14a_1$, $14b_1$, $14c_1$ and $14d_1$ of the plurality of elastic supporting members 14a, 14b, 14c and 14d. With the coil bobbin thus fixed into the lens holder 12, because the winding starts and the winding ends of the focussing coil 13a and the tracking coil 13b are severally wound around the terminal portions 21a, 21b, 21c and 21d, it is possible to perform continuity testing of the focussing coil 13a and the tracking coil 13b and measurement of the magnetic fields generated thereby by supplying a voltage between either the first lead frame 19 or the second lead frame 20 and a holder portion elastic supporting member of either the elastic supporting members 14a and 14c of the upper holder portion 12a or the elastic supporting members 14b and 14d of the lower holder portion 12b.

After all the connection and assembly work on the lens holder 12 is finished, the upper and lower assemblies 17 and 18 are cut from the first and second lead frames 19 and 20 by a cutting apparatus. After that, the fixing member 16 is mounted on the mounting portion 15a, whereby the yoke portion 22a and the magnet 23 are inserted into the through hole 13e of the coil bobbin 13 and the focussing coil 13a and the tracking coil 13b are inserted into the gap between the magnet 23 and the yoke portion 22b. The focussing coil 13a and the tracking coil 13b oppose the yoke portion 22b. The portions $14a_2$, $14b_2$, $14c_2$ and $14d_2$ of the plurality of elastic supporting members 14a, 14b, 14c and 14d which project from the fixing member 16 are electrically connected to an external servo circuit so that electricity is supplied to the focussing coil 13a and the tracking coil 13b, and the lens holder 12 and the consequently the objective lens 11 are driven in the focussing direction Fcs and the tracking direction Trk. Of course, alternatively, one of the assembly bodies 17 and 18 may be cut in advance from the respective lead frame and fixed to the other assembly body, the objective lens 11 and the coil bobbin 13 may be fixed and then finally the other assembly body can be cut from the other lead frame. Or, the objective lens 11 and the coil bobbin 13 can be fixed as described above after both the upper and lower assembly bodies 17 and 18 are cut from the first and second lead frames and joined together.

Figure 9:
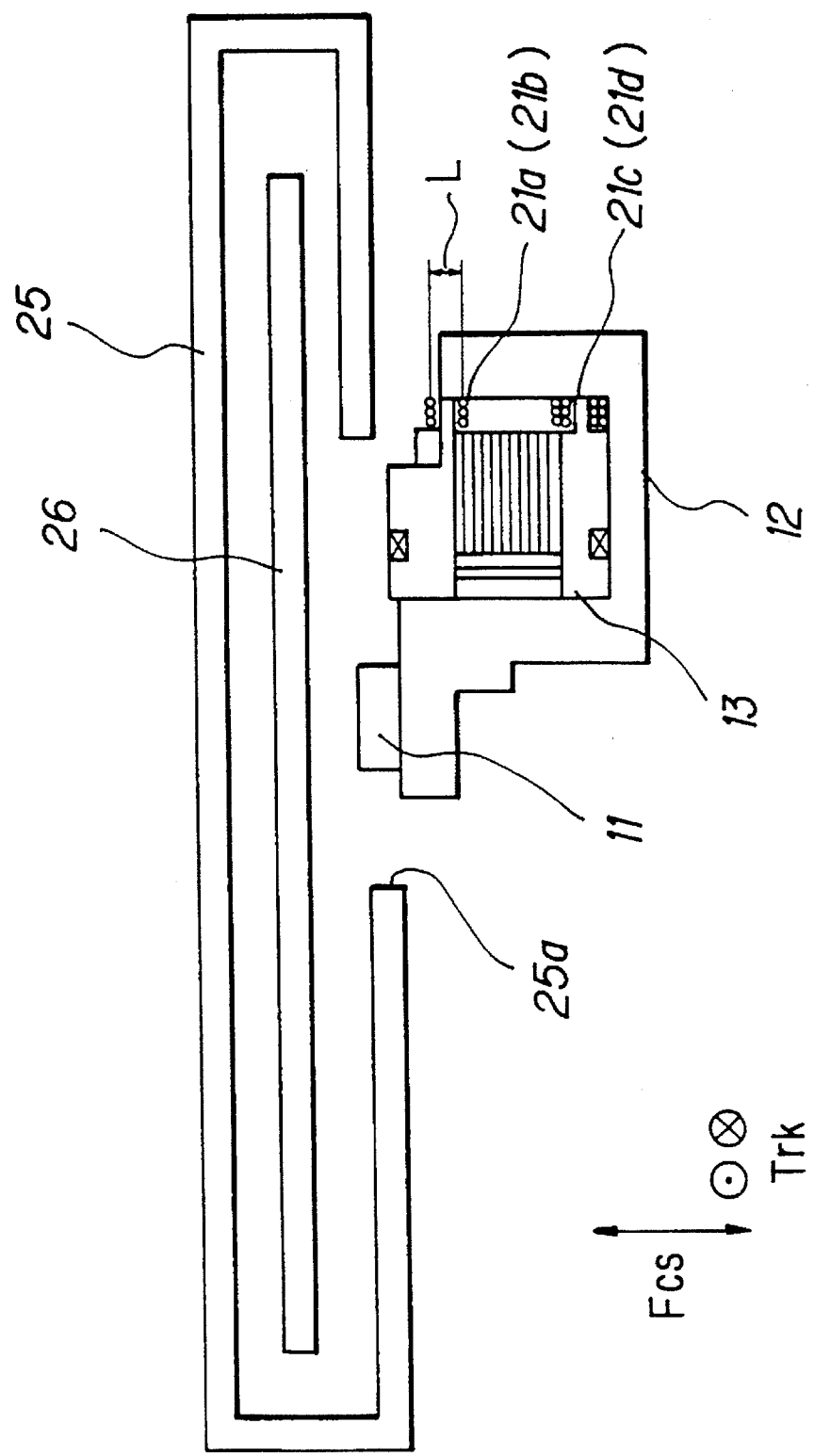
FIG. 9 is a main-part sectional view of an objective lens drive device according to the invention used in a recording and/or reproducing apparatus which uses a disc cartridge.

When an objective lens drive device 10 thus constructed is used in a recording and/or reproducing apparatus which uses an optical disc 26 contained a disc cartridge 25 as the recording medium, as shown in FIG. 9, the objective lens drive device 10 is so disposed inside the body of the recording and/or reproducing apparatus that the objective lens 11 is opposed to the recording surface of the optical disc 26 through an opening portion 25a of the disc cartridge 25. At this time, the optical axis of the objective lens 11 is perpendicular to the recording surface of the optical disc 26. Here, the terminal portions 21a and 21b of the coil bobbin 13 are positioned close to the opening portion 25a and are liable to make contact with the opening portion 25a or portions in the vicinity thereof. In order to avoid any such contact between the terminal portions 21a and 21b and the opening portion 25a or portions in the vicinity thereof, the terminal portions 21a and 21b are not wound with the winding starts of the focussing coil 13a and the tracking coil 13b but rather are wound with the winding ends of the focussing coil 13a and the tracking coil 13b. The reason for this is that because the winding start portions of the focussing coil 13a and the tracking coil 13b are doubly wound in order to prevent fraying of the lead wires, if the winding start portions of the focussing coil 13a and the tracking coil 13b are wound on the terminal portions 21a and 21b, the windings on these terminals are thick. As shown in FIG. 9, by winding the winding end portions of the lead wires of the focussing coil 13a and the tracking coil 13b on the terminal portions 21a and 21b, the thickness can be reduced to the thickness indicated in FIG. 9, with the letter L and the terminal portions 21a and 21b making contact with the opening portion 25a or portions in the vicinity thereof can be avoided.

Figure 10:
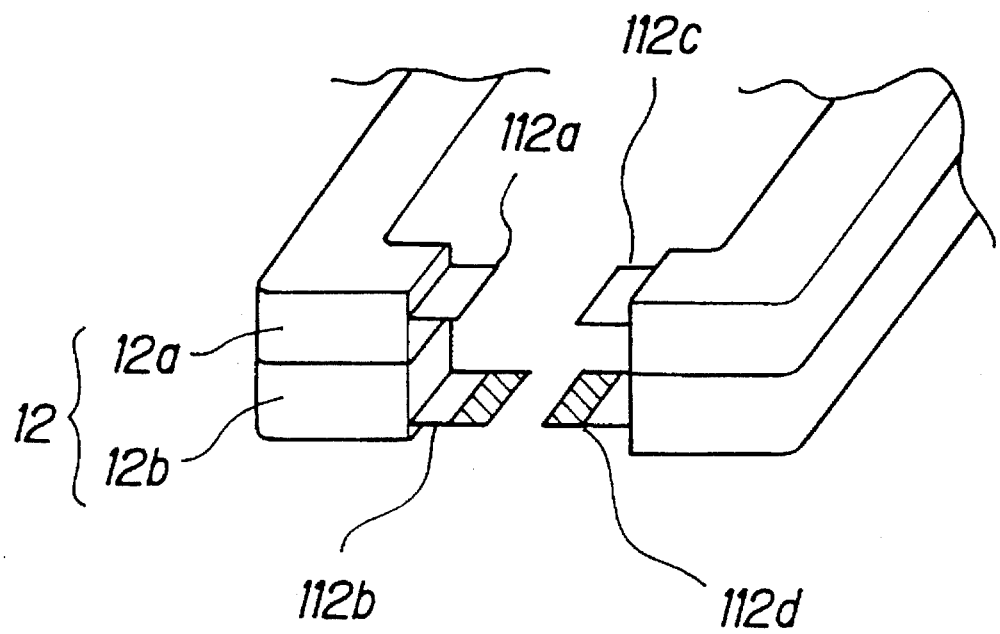
FIG. 10 is a perspective view showing an example of an alternative electricity supply terminals configuration.

In the objective lens drive device 10 described above, the plurality of elastic supporting members 14a, 14b, 14c and 14d are formed integrally with the upper holder portion 12a and the lower holder portion 12b such that the end portions $14a_1$, $14b_1$, $14c_1$ and $14d_1$ of the elastic supporting members 14a, 14b, 14c and 14d project into the notch portion 12d of the lens holder 12. When special supply terminals for supplying electricity to the terminal portions 21a, 21b, 21c and 21d are to be provided, all that is necessary is to integrally provide the lens holder 12 with a plurality of terminal portions 112a, 112b, 112c and 112d by an insert molding method. In this case, the end portions of the terminal portions 112b and 112d molded integrally with the lower holder portion 12b are made longer than the terminal portions 112a and 112c formed integrally with the upper holder portion 12a by the amount of the hatched portions in FIG. 10. In other words, the amount by which the terminal portions 112a and 112c project from the upper holder portion 12a is made smaller than the amount by which the terminal portions 112b and 112d project from the lower holder portion 12b. As a result, the assembly of inserting the coil bobbin 13 into opening portion 12c in the lens holder 12 can be carried out easily.

In the objective lens drive device 10 described above, because the plurality of terminal portions 21a, 21b, 21c and 21d are disposed at the opposite end of the lens holder 12 to the objective lens 11 and project toward the fixing member 16, the center of gravity of the lens holder 12 moves away from the objective lens 11. As a result, a balancer for balancing the weight of the movable parts (including the lens holder 12) is not necessary, resonance during a tracking servo operation and a focussing servo operation of the lens holder 12 can be prevented.

Also, in winding the focussing coil 13a and the tracking coil 13b onto the coil bobbin 13, (where which one's of the plurality of terminal portions 21a, 21b, 21c and 21d are made to be winding start terminals and which one's are made to be winding end terminals need not be decided in conformity with the examples shown in FIG. 7 and FIG. 8), it only is necessary that the winding starts and the winding ends be displaced vertically. It is preferable that the winding starts of the focussing coil 13a and the tracking coil 13b be on the lower terminal portions, that is the terminal portions 21c and 21d, because the center of gravity descends by an amount owing to the lead wires being doubly wound on these terminal portions in order to prevent the lead wires from fraying, and this is beneficial to the weight balance of the objective lens drive device 10.

In the example described above, the terminal portions 21a, 21b, 21c and 21d were so disposed on the coil bobbin 13 that they were oriented in a direction orthogonal to the tracking direction Trk. Alternatively the terminal portions 21a, 21b, 21c and 21d could be so disposed on the coil bobbin 13 so that they are oriented parallel to the tracking direction Trk. However, in this case, when an optical pickup device in which this objective lens drive device 10 is moved toward the inside portion of the optical disc 26, problems occur such as that the device contacts with the spindle motor of the recording and/or reproducing apparatus, not shown, which rotationally drives the optical disc 26. In this invention, by so disposing the terminal portions 21a, 21b, 21c and 21d on the coil bobbin 13 such that they are oriented in a direction orthogonal to the tracking direction Trk as described above, these kinds of problems can be avoided.

Figure 6B:
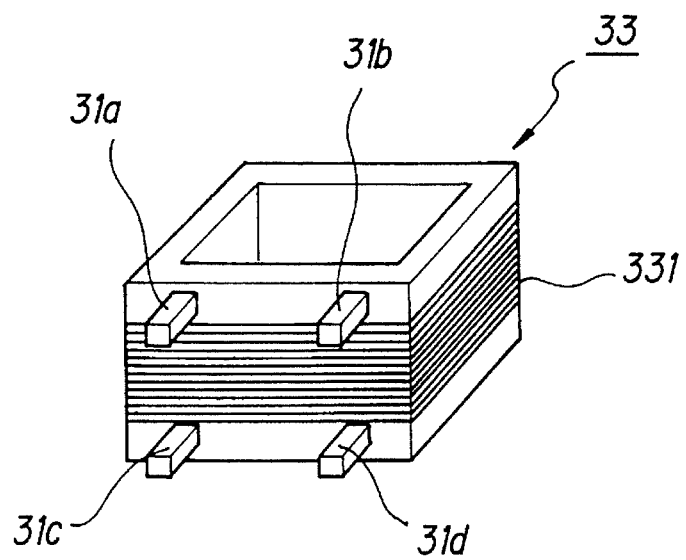
FIG. 6(B) is a perspective view of another example of a coil bobbin.

In the preferred embodiment described above, as shown in FIG. 6(A), the terminal portions 21a, 21b, 21c and 21d are so disposed that the distance between the terminal portions 21a and 21b positioned on the flange portion 13c at the upper end of the coil bobbin 13 is wider than the distance between the two terminal portions 21c and 21d positioned on the flange portions 13d at the lower end. However, the invention is not limited to this configuration, and the terminal portions can for example be configured as shown in FIG. 6(B). In FIG. 6(B), a coil bobbin 33 is shaped like a square pole having a central square through hole. A focussing coil 331 is wound around the coil bobbin 33. Although not shown in the drawings, a tracking coil like that shown in FIG. 6(A) is wound on one side of the coil bobbin 33. As shown in FIG. 6(B), a plurality of terminal portions 31a, 31b, 31c and 31d are so provided on the side face of the coil bobbin 33 opposite the face on which the tracking coil is wound such that they project from the upper and lower portions of the coil bobbin 33. These terminal portions 31a, 31b, 31c and 31d, when like the coil bobbin 13 shown in FIG. 6(A) where the coil bobbin 33 is fixed into the lens holder 12, are electrically connected to the end portions $14a_1$, $14b_1$, $14c_1$ and $14d_1$ of the plurality of elastic supporting members 14a, 14b, 14c and 14d. The terminal portions are so disposed that the spacing between the upper two terminal portions 31a and 31b and the spacing between the lower two terminal portions 31c and 31d are equal. The coil bobbin 33 shown in FIG. 6(B), although inferior to the configuration shown in FIG. 6(A) in the ease with which it can be assembled to the lens holder 12, in other respects fulfills the same functions and provides similar benefits to those of the configuration shown in FIG. 6(A).

In the preferred embodiment described above, an objective lens drive device which drives an objective lens in a focussing direction and a tracking direction was used as an example. However, the invention is not limited to this and can be applied to an objective lens drive device for driving an objective lens in a focussing direction only.

This invention is not limited to the preferred embodiment described above, and various modifications within the scope of the invention can of course be made.

What is claimed is:

1. An objective lens drive device comprising:

a lens holder for holding an objective lens having an optical axis;

a plurality of elastic supporting members each having one end fixed to said lens holder and another end fixed to a fixed portion, said elastic supporting members movably supporting said lens holder in a direction parallel to the optical axis of said objective lens and in a horizontal direction orthogonal to the optical axis of said objective lens; and a coil bobbin around which is wound a focussing coil, at least one tracking coil being attached to said focusing coil, said coil bobbin being provided with a plurality of projecting terminals on which are wound the coil ends of said focussing coil and said tracking coil.

2. An objective lens drive device according to claim 1, wherein said plurality of terminals are so disposed on a side face of said coil bobbin that lines joining them form a trapezoid, a first distance between two of said terminals that are located at an upper end of said coil bobbin in the optical axis direction is not equal to a second distance between two of said terminals that are located at a lower end of said coil bobbin in the optical axis direction.

3. An objective lens drive device according to claim 1, wherein said lens holder forms an opening and a notch portion into which said coil bobbin is inserted, said coil bobbin is arranged in said opening in a direction parallel to the optical axis of said objective lens such that said plurality of terminals project into said notch portion.

4. An objective lens drive device according to claim 1, wherein one end portion of said lens holder is fixed to said objective lens, another end portion of said lens holder forms an opening and a notch portion, said coil bobbin is arranged in said opening in a direction parallel to the optical axis of said objective lens such that said terminals project into said notch portion toward said fixed portion.

5. An objective lens drive device according to claim 1, wherein said plurality of elastic supporting members are made of an electrically conductive material and are each severally electrically connected to said plurality of terminals.

6. An objective lens drive device according to claim 1, wherein said coil bobbin is formed in a tubular shape which has an opening portion parallel to the optical axis of said objective lens and is provided with a pair of flange portions at an upper end and a lower end thereof, and said plurality of terminals are provided on each of said flange portions.

7. A coil bobbin comprising:

a body formed in a tubular shape;

a first coil wound around the outside surface of said body in an axial direction thereof;

at least one planarly wound second coil having a central opening and arranged on said first coil; and a plurality of terminals projected from said body and provided on upper and lower side axial direction ends of said body, said plurality of terminals being severally wound around by end portions of said first and second coils.

8. A coil bobbin according to claim 7, wherein said plurality of terminals are so disposed on a side face of the coil bobbin that lines joining the terminals form a trapezoid.

9. A coil bobbin according to claim 8, wherein a first distance between two of said terminals that are located at an upper end of said coil bobbin is not equal to a second distance between two of said terminals that are located at a lower end of said coil bobbin.

10. An objective lens drive device comprising:

a lens holder for holding an objective lens having an optical axis;

a fixed member;

a plurality of elastic supporting members each having one end fixed to said lens holder and another end fixed to said fixed member, said elastic supporting members movably supporting said lens holder in a direction parallel to the optical axis of said objective lens and in a horizontal direction orthogonal to the optical axis of said objective lens;

a coil bobbin having a plurality of projecting terminals;

a focussing coil wound around said coil bobbin; and at least one tracking coil attached to said focusing coil, wherein said focussing coil and said tracking coil each having coil ends that are wound around said projecting terminals.

* * * * *